US010812565B2

(12) United States Patent
Kaplan et al.

(10) Patent No.: US 10,812,565 B2
(45) Date of Patent: *Oct. 20, 2020

(54) SYSTEMS AND METHODS TO CONFIGURE METADATA

(71) Applicant: PowWow, Inc., San Francisco, CA (US)

(72) Inventors: Jonathan Kaplan, San Francisco, CA (US); Andrew Cohen, San Francisco, CA (US)

(73) Assignee: PowWow, Inc., San Francisco, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/597,612

(22) Filed: May 17, 2017

(65) Prior Publication Data

US 2017/0251044 A1 Aug. 31, 2017

Related U.S. Application Data

(63) Continuation of application No. 14/097,167, filed on Dec. 4, 2013, now Pat. No. 9,953,299, and a
(Continued)

(51) Int. Cl.
*H04L 29/08* (2006.01)
*H04L 12/24* (2006.01)
(Continued)

(52) U.S. Cl.
CPC .............. *H04L 67/02* (2013.01); *H04L 67/34* (2013.01); *G06F 8/20* (2013.01); *G06F 8/60* (2013.01);
(Continued)

(58) Field of Classification Search
None
See application file for complete search history.

(56) References Cited

U.S. PATENT DOCUMENTS 6,058,399 A * 5/2000 Morag ............... H04L 29/06
707/610
6,323,884 B1 * 11/2001 Bird ................. G06F 3/04812
715/810
(Continued)

FOREIGN PATENT DOCUMENTS

JP 2000-067220 A 3/2000
JP 2000-324437 A 11/2000
(Continued)

OTHER PUBLICATIONS

Team Viewer 8 Manual Meeting; Team Viewer GmbH—Kuhnbergstraße16 D-73037, Göppingen; Rev. 8.1—Dec. 2012; pp. 1-61; http://www.teamviewer.com/en/help/firststeps.aspx.
(Continued)

*Primary Examiner* — Backhean Tiv
(74) *Attorney, Agent, or Firm* — Haynes and Boone LLP; Manita Rawat

(57) ABSTRACT

At least one server receives at least one signal representing a request for an initiation of the server for the installation and configuration of an application. The server connects with client(s) after receiving the signal and transmits at least one display image to the client such that the client can render the display image via a web interface, wherein the display image provides information regarding the server. The server receives an application installer, wherein the client is can use the web interface to facilitate transmission of the application installer. The server installs and configures the application based on at least one input received from the client, wherein the client is enabled to use the web interface to facilitate transmitting the input to the server. The server generates an image based on the application configuration and transmits the image to a data management system for storage until deployment.

24 Claims, 5 Drawing Sheets

Related U.S. Application Data continuation of application No. 14/097,195, filed on Dec. 4, 2013, now Pat. No. 9,661,054.

(51) Int. Cl.
  *G06F 8/20* (2018.01)
  *G06F 8/60* (2018.01)
  *G06F 8/71* (2018.01)
  *G06F 8/61* (2018.01)

(52) U.S. Cl.
  CPC ............... *G06F 8/61* (2013.01); *G06F 8/71* (2013.01); *H04L 41/0806* (2013.01)

(56) References Cited

U.S. PATENT DOCUMENTS

| | | | |
|---|---|---|---|
| 6,343,313 B1 | 1/2002 | Salesky et al. | |
| 6,411,685 B1* | 6/2002 | O'Neal | H04M 3/5307 379/100.08 |
| 6,691,154 B1 | 2/2004 | Zhu et al. | |
| 7,529,780 B1* | 5/2009 | Braginsky | H04L 67/42 |
| 7,533,133 B1* | 5/2009 | Lanzatella | G06F 21/6218 |
| 7,702,730 B2 | 4/2010 | Spataro et al. | |
| 8,762,887 B2* | 6/2014 | Jalon | G06F 16/168 715/838 |
| 9,661,054 B2* | 5/2017 | Kaplan | H04L 67/34 |
| 2001/0042118 A1* | 11/2001 | Miyake | H04L 41/22 709/223 |
| 2002/0113796 A1* | 8/2002 | Oshiyama | H04N 1/387 345/581 |
| 2002/0129136 A1* | 9/2002 | Matharu | H04L 41/046 709/223 |
| 2002/0174180 A1* | 11/2002 | Brown | G06F 16/1787 709/203 |
| 2003/0051070 A1* | 3/2003 | Shappir | G06F 9/455 719/328 |
| 2004/0037295 A1* | 2/2004 | Tanaka | H04L 12/4641 370/395.53 |
| 2005/0065912 A1* | 3/2005 | Cafrelli | G11B 27/11 |
| 2005/0240428 A1* | 10/2005 | Gabrick | G06Q 10/10 705/310 |
| 2005/0240918 A1* | 10/2005 | Shlomai | G06F 9/44573 717/162 |
| 2006/0004815 A1* | 1/2006 | Murata | G06F 16/86 |
| 2006/0212771 A1* | 9/2006 | Fabbrocino | G06F 11/0742 714/746 |
| 2006/0218548 A1* | 9/2006 | Mason | G06F 8/60 717/174 |
| 2007/0136257 A1* | 6/2007 | Yoshizawa | G06F 16/78 |
| 2008/0016186 A1* | 1/2008 | Ball | G06F 8/61 709/220 |
| 2008/0104170 A1* | 5/2008 | Ananthanarayanan | H04W 12/003 709/204 |
| 2008/0114791 A1* | 5/2008 | Takatsu | G06Q 10/06 |
| 2008/0141244 A1* | 6/2008 | Kelley | G06F 8/61 717/178 |
| 2008/0155525 A1* | 6/2008 | Ho | G06Q 20/3676 717/168 |
| 2008/0225842 A1 | 9/2008 | Goldfein | |
| 2009/0070482 A1* | 3/2009 | Hickmott | H04L 67/108 709/233 |
| 2009/0157694 A1* | 6/2009 | Lee | G06F 16/14 |
| 2009/0204711 A1* | 8/2009 | Binyamin | H04L 65/60 709/226 |
| 2009/0235353 A1* | 9/2009 | Ammerlaan | G06F 8/60 726/22 |
| 2009/0276516 A1* | 11/2009 | Ruppert | G07F 17/323 709/224 |
| 2009/0327894 A1* | 12/2009 | Rakib | H04N 21/4725 715/719 |
| 2010/0180218 A1* | 7/2010 | Boston | G06F 3/0481 715/759 |
| 2010/0293097 A1* | 11/2010 | Pomeroy | H04L 67/104 705/58 |
| 2010/0313179 A1* | 12/2010 | Groves | G06F 8/34 717/101 |
| 2010/0329140 A1* | 12/2010 | Buford | H04M 3/4217 370/252 |
| 2011/0078318 A1* | 3/2011 | Desai | H04L 29/08171 709/228 |
| 2011/0123169 A1 | 5/2011 | Liu | |
| 2011/0131225 A1* | 6/2011 | Mayer | G06Q 10/10 707/758 |
| 2011/0224811 A1 | 9/2011 | Lauwers et al. | |
| 2011/0239117 A1 | 9/2011 | Sutton et al. | |
| 2011/0276661 A1 | 11/2011 | Gujarathi et al. | |
| 2012/0246631 A1* | 9/2012 | Chen | H04L 67/34 717/172 |
| 2012/0260232 A1* | 10/2012 | Hirsch | G06F 8/36 717/107 |
| 2012/0271902 A1 | 10/2012 | Baliga | |
| 2013/0239009 A1 | 9/2013 | DeGrazia | |
| 2013/0268894 A1* | 10/2013 | Jeon | G06F 3/04883 715/835 |
| 2014/0101664 A1 | 4/2014 | Inomata | |
| 2014/0185950 A1* | 7/2014 | Saint Macary | H04N 19/507 382/251 |
| 2014/0258968 A1* | 9/2014 | Brown | G06F 40/166 717/103 |
| 2014/0258969 A1* | 9/2014 | Brown | G06F 8/30 717/103 |
| 2014/0258970 A1* | 9/2014 | Brown | G06F 8/47 717/103 |
| 2014/0297700 A1* | 10/2014 | Vongsouvanh | G06F 16/182 707/827 |
| 2014/0324967 A1* | 10/2014 | Atias | H04L 67/02 709/204 |
| 2015/0036535 A1 | 2/2015 | Mosko | |
| 2015/0058461 A1* | 2/2015 | Guiditta | H04L 41/0843 709/223 |
| 2015/0156062 A1* | 6/2015 | Kaplan | H04L 67/34 709/203 |
| 2015/0163292 A1* | 6/2015 | Lemire | H04L 67/10 709/203 |
| 2015/0294024 A1* | 10/2015 | Zhang | G06F 16/9577 709/217 |
| 2015/0332029 A1* | 11/2015 | Coxe | H04L 63/06 726/9 |
| 2017/0251044 A1* | 8/2017 | Kaplan | H04L 67/34 |

FOREIGN PATENT DOCUMENTS

| | | |
|---|---|---|
| JP | 2013-105204 A | 5/2013 |
| KR | 102009-0114759 A | 11/2009 |

OTHER PUBLICATIONS

Espacenet Translation for KR20090114759 (A); System and Method for Processing Renewal Web Viewer Screen of Mobile Communication Terminal; 11 pages.

PCT International Search Report and Written Opinion dated Feb. 17, 2015, from corresponding International Patent Application No. PCT/US2014/068507, 10 pages.

PCT International Search Report and Written Opinion dated Mar. 23, 2015, from related International Patent Application No. PCT/US2014/068513, 9 pages.

PCT International Preliminary Report on Patentability dated Jun. 16, 2016, from corresponding International Patent Application No. PCT/US2014/068513, 7 pages.

PCT International Preliminary Report on Patentability dated Jun. 16, 2016, from corresponding International Patent Application No. PCT/US2014/068507, 9 pages.

(56) References Cited

OTHER PUBLICATIONS

PCT International Search Report and Written Opinion dated Oct. 18, 2016, from International Patent Application No. PCT/US2016/040536, 12 pages.

* cited by examiner

SYSTEMS AND METHODS TO CONFIGURE METADATA

RELATED AND CO-PENDING APPLICATION

This application is a continuation of and claims priority to U.S. patent application Ser. No. 14/097,195 entitled SYSTEMS AND METHODS TO CONFIGURE APPLICATIONS filed on Dec. 4, 2013, and U.S. patent application Ser. No. 14/097,167 entitled SYSTEMS AND METHODS FOR SHARING IMAGE DATA, filed on Dec. 4, 2013, the disclosures of which are incorporated herein by reference in their entirety.

BACKGROUND

In systems, such as computing systems, one or more software programs or applications that are being executed on a server or host computing device can be shared with one or more remote clients or remote computing devices. For example, at least some known computing devices include browsers that support various mechanisms for receiving a continuous stream of data, such as image data, from the server, wherein the image data is based on the application being executed within the server. In a virtual desktop infrastructure (VDI), a virtual desktop may be accessible by one or more remote clients through a network and a server may be used to provide various image data from the virtual desktop to one or more remote clients. More specifically, each remote client may include a browser or a web client that supports various methods for receiving a continuous stream of image data from the server.

Using such concepts, the software programs or applications can be used via the remote clients or remote computing devices. However, there may be no direct access to the host server or computing device for the user or owner of the application. For example, data, such as metadata about the application is managed via a web interface directly in the browser, while the application itself is managed via a separate remote desktop application. As such, the user or owner of the application is unable to install and run the application directly in the same browser where the application is being managed.

BRIEF DESCRIPTION

In one embodiment, a system is provided that facilitates an application to be installed or configured such that the application can be run directly in the same browser where the application is being managed. The system generally includes at least one server that is configured to receive at least one signal representing a request for an initiation of the server for the installation and configuration of an application. The server is also configured to connect with at least one client after receiving the signal and to transmit at least one display image to the client such that the client is enabled to render the display image via a web interface, wherein the display image provides information regarding the server. The server is further configured to receive an application installer, wherein the client is enabled to use the web interface to facilitate a transmission of the application installer. The server is configured to commence installing the application and to configure the application based on at least one input received from the client, wherein the client is enabled to use the web interface to facilitate transmitting the input to the server. The server is configured to generate a server image based on the application configuration and to transmit the server image to a data management system, wherein the server image is stored in the data management system for deployment.

In another embodiment, a method of configuring an application is provided. At least one signal is received via at least one server, wherein the signal represents a request for an initiation of the server for the installation and configuration of an application. The server is connected with at least one client after receiving the signal. At least one display image is transmitted from the server to the client such that the client is enabled to render the display image via a web interface, wherein the display image provides information regarding the server. An application installer is received via the server, wherein the client is enabled to use the web interface to facilitate a transmission of the application installer. Installation of the application is commenced via the server. The application is configured based on at least one input received from the client, wherein the client is enabled to use the web interface to facilitate transmitting the input to the server. A server image is generated based on the application configuration via the server and the server image is transmitted from the server to a data management system, wherein the server image is stored in the data management system for deployment.

In yet another embodiment, at least one computer-readable storage medium is provided. The computer-readable storage medium has computer-executable instructions embodied thereon, wherein, when executed by at least one processor, the computer-executable instructions cause the processor to receive at least one signal representing a request for an initiation of the processor for the installation and configuration of an application. The computer-executable instructions further cause the processor to connect with at least one client after receiving the signal and to transmit at least one display image to the client such that the client is enabled to render the display image via a web interface, wherein the display image provides information regarding the processor. The computer-executable instructions also cause the processor to receive an application installer, wherein the client is enabled to use the web interface to facilitate a transmission of the application installer. The computer-executable instructions cause the processor to commence installing the application and to configure the application based on at least one input received from the client, wherein the client is enabled to use the web interface to facilitate transmitting the input to the processor. The computer-executable instructions further cause the processor to generate a processor image based on the application configuration and to transmit the processor image to a data management system, wherein the processor image is stored in the data management system for deployment.

DETAILED DESCRIPTION

Figure 1:
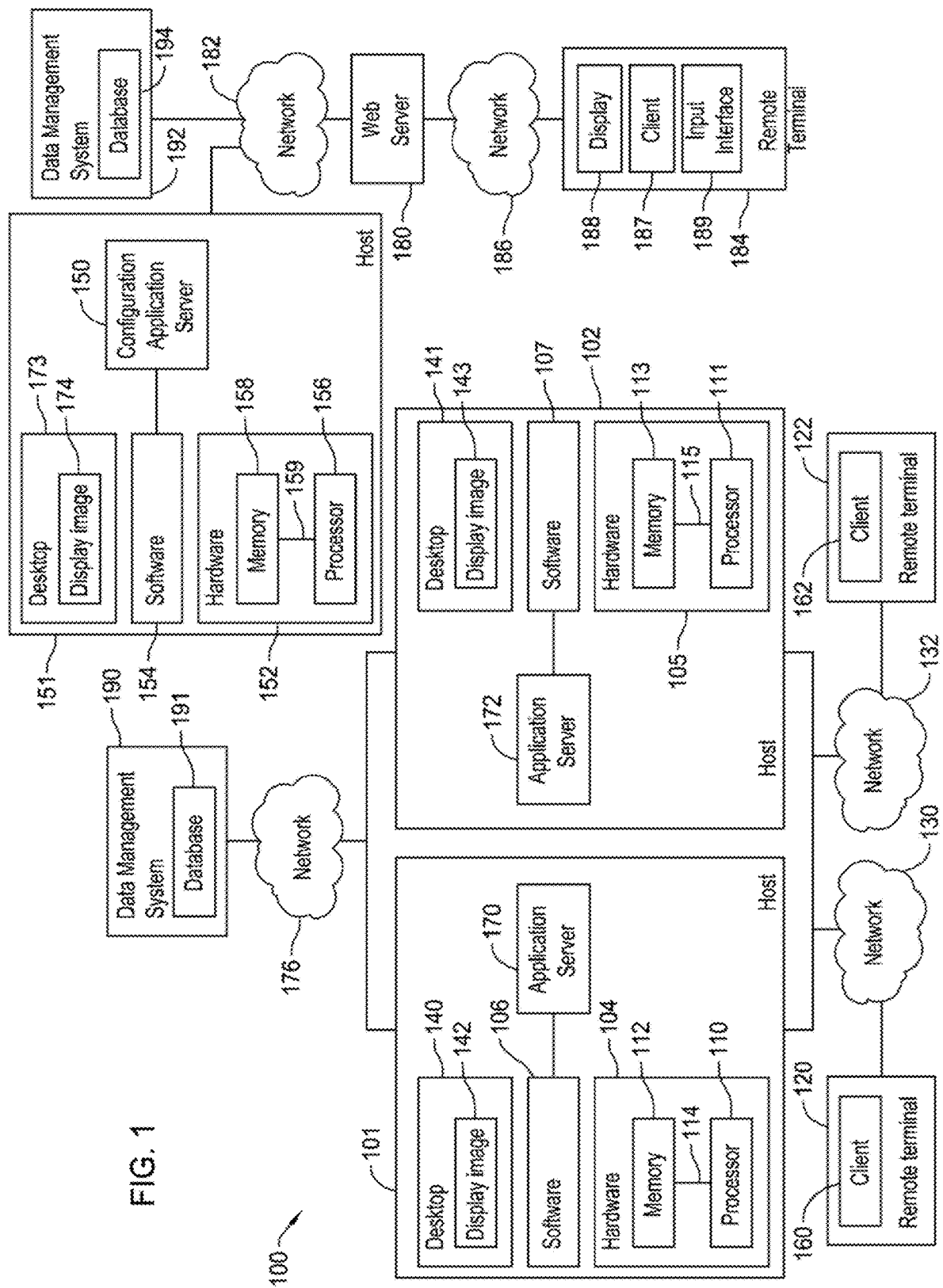
FIG. 1 is a block diagram of an exemplary system having one or more servers in communication with one or more clients.

FIG. 1 illustrates an exemplary system 100 that includes one or more physical computer systems or hosts, such as host 101 and host 102. In some embodiments, each host 101 and 102 includes hardware units 104 and 105, respectively, and software 106 and 107, respectively. Software 106 and 107 run on hardware units 104 and 105, respectively, such that various applications or programs can be executed on hardware units 104 and 105 by way of respective software 106 and 107. In some embodiments, the function of software 106 and 107 can be implemented directly in respective hardware 104 and 105, e.g., as a system-on-a-chip, firmware, field-programmable gate array (FPGA), etc. In some embodiments, hardware units 104 and 105 each includes one or more processors, such as processor 110 and processor 111, respectively. In some embodiments, processors 110 and 111 are each an execution unit, or "core," on a microprocessor chip. In some embodiments, processors 110 and 111 may each include a processing unit, such as, without limitation, an integrated circuit (IC), an application specific integrated circuit (ASIC), a microcomputer, a programmable logic controller (PLC), and/or any other programmable circuit. Alternatively, processors 110 and 111 may each include multiple processing units (e.g., in a multi-core configuration). The above examples are exemplary only, and, thus, are not intended to limit in any way the definition and/or meaning of the term "processor."

Each hardware unit 104 and 105 also includes a system memory 112 and 113, respectively, wherein each memory 112 and 113 is coupled to respective processor 110 and 111 via a system bus 114 and 115, respectively. Each memory 112 and 113 can be a general volatile random access memory (RAM). For example, each hardware unit 104 and 105 can include a 32 bit microcomputer with 2 Mbit ROM and 64 Kbit RAM. Each memory 112 can also be a read-only memory (ROM), a network interface (NIC), and/or other device(s).

In some embodiments, one or more end users may connect to, and interact with, host 101 and/or host 102 by using separate remote terminals. For example, two different end users in different locations can connect to host 101 and/or 102 by each using separate remote terminals 120 and 122. Each remote terminal 120 and 122 can be capable of communicating with host 101 and/or host 102 via separate networks 130 and 132, respectively. Each network 130 and 132 can be the Internet, a local area network (LAN), a wide area network (WAN), a personal area network (PAN) or any combination thereof, and each network 130 and 132 can transmit information between host 101 and/or host 102 and remote terminal terminals 120 and 122, respectively, at different rates or speeds. Remote terminals 120 and 122 can each be a desktop computer, laptop, mobile device, tablet, thin client, or other device having communications interface. Each remote terminal 120 and 122 can also be capable of displaying applications running inside host 101 and/or host 101 to the end user using a computer display (not shown) or other output device. In some embodiments, each remote terminal 120 and 122 can also be capable of receiving user input from the respective end user and transmitting the received user input to host 101 and/or host 102.

In some embodiments, each host 101 and 102 can output at least one desktop each, such as desktop 140 and desktop 141, respectively, to a user of respective host 101 and 102. Desktops 140 and 141 can each be an interactive user environment provided by an operating system and/or applications running within respective host 101 and 102, and generally includes one or more screens or displays images, such as display image 142 and display image 143, respectively, but may include other outputs, such as audio, indicator lamps, tactile feedback, etc. Each desktop 140 and 141 can also accept input from the user in the form of device inputs, such as keyboard and mouse inputs. In some embodiments, each desktop 140 and 141 can also accept simulated inputs, such as simulated keyboard and mouse inputs. In addition to user input and/or output, each desktop 140 and 141 can send and receive device data, such as input and/or output for a FLASH memory device local to the user, or to a local printer. In some embodiments, each display image 142 and 143 can be presented to each end user on the computer displays of remote terminals 120 and 122.

In some embodiments, each host 101 and 102 includes at least one server, such as application server 170 and application server 172, respectively, that are each in communication with respective software 106 and 107. Each application server 170 and 172 can also be in communication with each remote terminal 120 and 122. For example, in some embodiments, each application server 170 and 172 can be in communication with a client in each of the remote terminal 120 and 122, such as clients 160 and 162, respectively. Each application server 170 and 172 can be in communication with clients 160 and 162 via networks 130 and 132, respectively. In some embodiments, each client 160 and 162 can be a web client or web browser that is configured to run on respective remote terminals 120 and 122 and is configured to connect to application servers 170 and 172 as appropriate.

In some embodiments, each application server 170 and 172 can be implemented on a stand-alone server (not shown) and/or connected to one or more additional servers. For example, in some embodiments, application servers 170 and 172 can be connected to a configuration application server 150 via network 176. Network 176 can be the Internet, a LAN, a WAN, or any combination thereof, and network 176 can transmit information between configuration application server 150 and application servers 170 and 172. In some embodiments, configuration application server 150 can be implemented within a physical computer system or host 151. Alternatively, configuration application server 150 can be implemented on a stand-alone server (not shown). In some embodiments, similar to hosts 101 and 102, host 151 can also include a hardware unit 152 and software 154. Software 154 can run on hardware unit 152 such that various applications or programs can be executed on hardware 152 by way of software 154. In some embodiments, the functions of software 154 can be implemented directly in hardware unit 152, e.g., as a system-on-a-chip, firmware, FPGA, etc. In some embodiments, similar to hardware units 104 and 105, hardware unit 152 also includes one or more processors 156. Similar to hardware units 104 and 105, hardware unit 152 also includes a system memory 158 that is coupled to processor 156 via a system bus 159. In some embodiments, similar to host 101 and 102, host 151 can also provide at least one desktop each, such as desktop 173, which includes a display image 174.

In some embodiments, configuration application server 150 can also be connected to a web server 180 via a network 182. In some embodiments, web server 180 and can be hosted together with a presence server (not shown). Network 182 can also be the Internet, a LAN, a WAN, or any combination thereof, and can transmit information between configuration application server 150 and web server 180. Moreover, in some embodiments, configuration application server 150 and/or web server 180 can also be in direct communication with clients 160 and 162 via the respective networks 130 and 132. Web server 180 can also be in direct communication with application servers 170 and 172 in some embodiments.

In some embodiments, any data, such as images and/or image data (i.e., meta data) that is generated by configuration application server 150 can be stored in a data management system 190 that is in communication with configuration application server 150 via network 176. For example, in some embodiments, data management system 190 includes a database 191 for storing data. Data management system 190 can be managed and/or run by a third party, such as Amazon or Microsoft that provide Amazon Elastic Block Store or Windows Azure Drives, respectively. Database 191 can include the data received from configuration application server 150. In some embodiments, the data management system 190 can store a system image comprising the entire state of a computer system, including the entire contents of that computer's RAM. In some embodiments, the data management system 190 can store a server image comprising the entire state of a server that is running on a computer. In some embodiments, data management system 190 can communicate directly with each host 101 and 102. Data management system 190 can also communicate directly with remote terminals 120 and 122 in some embodiments. An additional data management system 192 that includes a database 194 can be in communication with web server 180, wherein database 194 can include metadata.

In some embodiments, web server 180 can be communication with an administrator of an application that is using, for example, remote terminal 184, via network 186. Network 186 can also be the Internet, a LAN, a WAN, or any combination thereof, and can transmit information between web server 180 and remote terminal 184. For example, in some embodiments, web server 180 can be in communication with a client 187 in remote terminal 184. Web server 180 can be in communication with client 187 via network 186. In some embodiments, client 187 can be a web client or web browser that is configured to run on remote terminal 184 and is configured to connect to web server 180 as necessary. In some embodiments, client 187 can be in direct communication with configuration application server 150 via network 182.

In some embodiments, remote terminal 184 can be a desktop computer, laptop, mobile device, tablet, thin client, or other device having communications interface. Similar to remote terminals 120 and 122, remote terminal 184 can also be capable of displaying applications running inside, for example, host 101 and/or host 102, to the administrator using a computer display 188 or other output device. In some embodiments, the administrator can use an input interface 189 within remote terminal 184 to communicate with web server 180 such that the administrator can input commands to run, install, and/or configure applications that can be viewed by remote terminals 120 and 122. Input interface 189 may include, for example, a keyboard, a pointing device, a mouse, a stylus, a touch sensitive panel (e.g., a touch pad or a touch screen), a gyroscope, an accelerometer, a position detector, and/or an audio input device.

System 100 can be implemented on one or more physical enterprise or desktop computer system, such as a work or home computer that is remotely accessed when travelling. Alternatively, system 100 may be implemented on a virtual desktop infrastructure (VDI) that has a plurality of virtual machines (VMs) (not shown) on each host 101, 102, and 151 (such as an enterprise computer system). For example, in some embodiments, application servers 170 and 172 can be connected to a plurality of VMs on respective host 101 and 102 and, similarly, configuration application server 150 can be connected to a plurality of VMs on host 151. In a VDI deployment, desktop 173 can be exported from a corresponding one of the VMs to remote terminal 184. Similarly, desktop 140 and 141 can be exported from a corresponding one of the VMs to remote terminals 120 and 122. In such an embodiment, software 106, 107, and 154 can each be virtualization software and the VMs can be executing on respective hardware 104, 105, and 152 by way of the virtualization software. It should therefore be understood that the present disclosure can be implemented in a variety of contexts, but may be particularly useful wherever graphical user interface remote displaying is implemented.

During operation of system 100, as explained in more detail below with respect to FIGS. 2 and 3A-3C, an administrator of an application using remote terminal 184 is provided tools to install and/or configure one or more applications such that the application(s) are run directly in the same client 187 (e.g., browser) where the application(s) are being managed. For example, in some embodiments, the administrator can use remote terminal 184 to transmit a request to web server 180 to install and configure an application via configuration application server 150. The request can be an input by the administrator using a web-based interface provided by client 187 on display 188. In response to the request, web server 180 can transmit at least one signal to configuration application server 150 to initiate or launch the configuration instance for the application. Configuration application server 150 can initiate the configuration instance for the application and configure the application based on inputs received by the administrator through client 187. The inputs for the configurations can also be made by the administrator using the web-based interface. The configuration application server 150 can generate an image based on the application configuration and transmit the image. In some embodiments, the image can contain the entire content of the configuration server, including the operating system and all installed applications. In other embodiments, the image may only contain information about a single image. At the same time, web server 180 can configure image data, such as metadata. The image and/or the metadata can be stored in data management system 190 and data management system 192, respectively. The image and/or metadata can be later deployed to, for example, application servers 170 and/o 172 for use by at least one of the remote terminals 120 and 122. For example, the image and/or image data can be transmitted to application servers 170 and/or 172 such that the image and image data can be subsequently transferred to remote terminals 120 and 122. Accordingly, by using this approach, the application can be installed and run directly in the same browser (i.e., client 187) where the application is being managed by the administrator.

Figure 2:
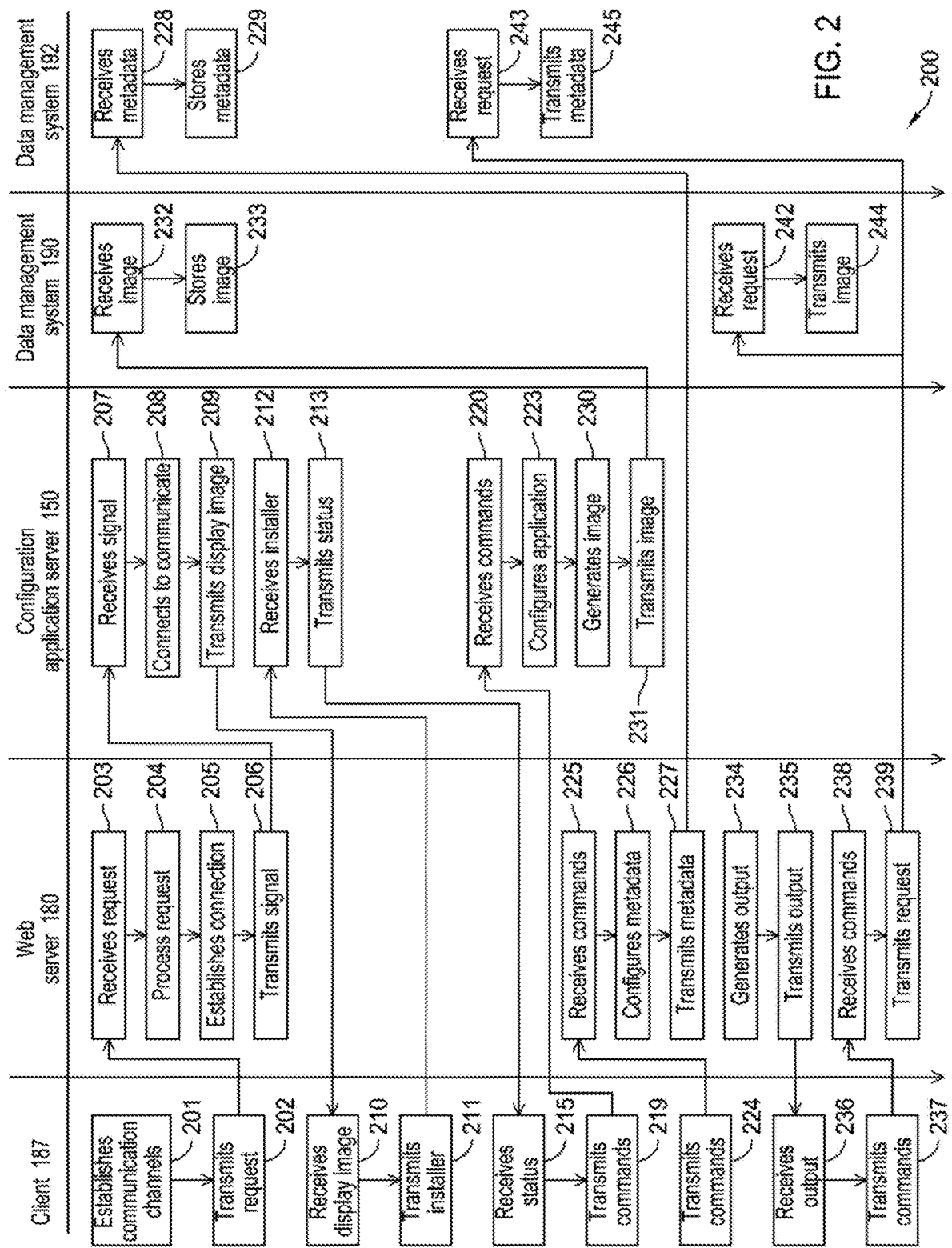
FIG. 2 is a swimlane diagram of an exemplary method for configuring an application using the system shown in FIG. 1.

FIG. 2 is a swimlane diagram 200 of an exemplary method for configuring one or more applications using system 100 (shown in FIG. 1). This method may be embodied within a plurality of computer-executable instructions stored in one or more memories, such as one or more computer-readable storage mediums. The computer storage mediums include non-transitory media, which may include volatile and nonvolatile, removable and non-removable mediums implemented in any method or technology for storage of information such as computer-readable instructions, data structures, program modules or other data. The instructions may be executed by one or more processors to perform the functions described herein.

Figure 3A:
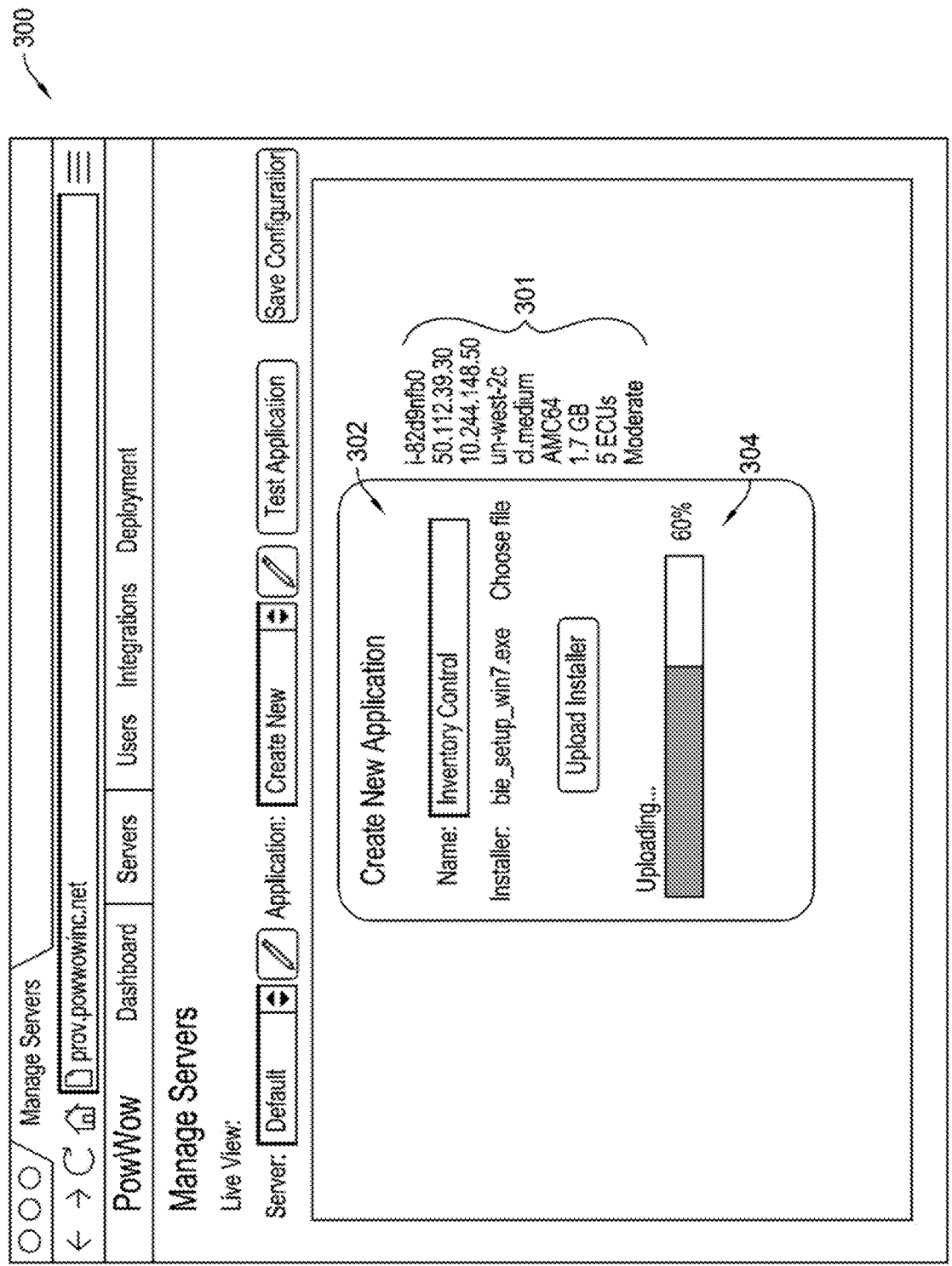
FIGS. 3A-3C are each block diagrams of exemplary interfaces that can be generated by the system shown in FIG. 1.

In operation 201, client 187 establishes one or more communication channels with web server 180 via network 186 (shown in FIG. 1), wherein the channel(s) facilitate communication between client 187 and web server 180 such that data can be shared between client 187 and web server 180. For example, in some embodiments, web server 180 can share a web-based interface having display image(s) or outputs with client 187. FIG. 3A illustrates a web-based interface 300 that can be generated by web server 180 and displayed by client 187 on remote terminal 184.

Referring to FIG. 2, in operation 202, client 187 transmits at least one request to web server 180, wherein the request is a request to initiate and configure one or more applications by a server. This request is made by an administrator via client 187 through a web-based interface, such as interface 300, that the administrator can see and input information in using display 188 (shown in FIG. 1) and input interface 189 (shown in FIG. 1). In operation 203, web server 203 receives the request. In operation 204, web server 180 processes the request. In operation 205, web server 180 establishes a connection with a server, such as configuration application server 150. Web server 180 transmits at least one signal representing a request for an initiation of the server for the installation and configuration of an application to configuration application server 150 in operation 206. Configuration application server 150 receives the signal in operation 207. In some embodiments, web server 180, configuration application server 150, and client 187 can communicate and transmit information between each other similar to the systems and methods described in co-pending U.S. patent application Ser. No. 14/097,167 entitled SYSTEMS AND METHODS FOR SHARING IMAGE DATA filed on Dec. 4, 2013, which is incorporated herein by reference in its entirety.

In operation 208, configuration application server 150 connects with client 187. As such, client 187 is connected to web server 180 and configuration application server 150. In operation 209, configuration application server 150 transmits at least one display image to client 187. While FIG. 2 illustrates the display image being directly transmitted from configuration application server 150 to client 187, the display image may also be transmitted by configuration application server 150 using web server 180 in some embodiments.

In operation 210, client receives display image 210. In some embodiments, the display image can be transmitted and received similar to the systems and methods described in co-pending U.S. patent application Ser. No. 14/097,167 entitled SYSTEMS AND METHODS FOR SHARING IMAGE DATA filed on Dec. 4, 2013, which is incorporated herein by reference in its entirety.

In some embodiments, client can render and view the display image because it can be positioned and part of the web-based interface that client is viewing. For example, referring to FIG. 3A, web-based interface 300 includes a display image 301 that was provided by, for example, configuration application server 150. In some embodiments, display image 301 can provide information about configuration application server 150, such as the software installed on the server. In some embodiments, the client can send messages, such as mouse and keyboard movements, allowing an administrator to interact with configuration application server 150, for example, to make configuration changes using the operating system. Because interface 300 is available directly in the client or browser window via display 188, the administrator can create a new application by selecting a drop-down menu 302 within interface 300 and provide the name of the application and the location of an installer binary.

Referring to FIG. 2, client 187 transmits the application installer to configuration application server 150 in operation 211. The application installer is received by configuration application server 150 in operation 212. For example, in some embodiments, client 187 can directly transmit an application installer file to configuration application server 150. Alternatively, the application installer file can be received by application server 150 using other known techniques, such as using a shared drive. In some embodiments, the file is transmitted in portions over a web protocol.

In operation 213, configuration application server 150 transmits a status notification of the receipt of the application installer file. For example, in some embodiments, the file is transmitted in portions and configuration application server 150 transmits the status of the portions that are being received until the entire file is received. In operation 215, the status notification is received by client 187 such that client 187 know the information being received by configuration application server 150. In some embodiments, the status notification can show the status 304 as a percentage of completion (i.e., 60% complete). The status notifications can be continuously sent client 187 and operations 211 to 215 can repeated until the file is fully received by configuration application server 150.

Figure 3B:
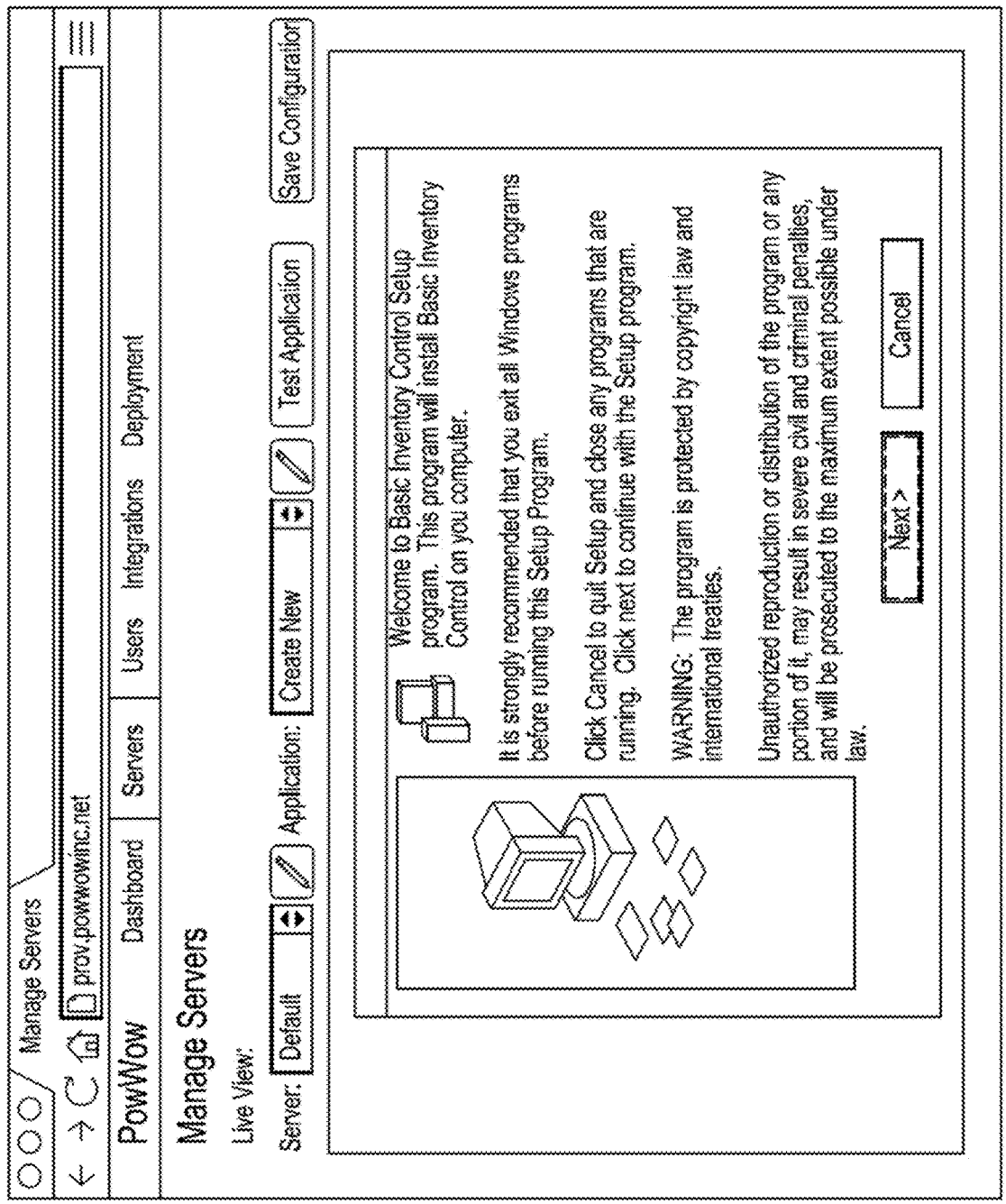

After configuration application server 150 receives the entire application installer file, client 187 is then enabled to run the installer directly in the web-based interface. For example, FIG. 3B illustrates a web-based interface 320 that client 187 can use to run and configure the application.

Referring to FIG. 2, since the file is fully received by configuration application server 150, an administrator is enabled to install the application and make any needed configuration changes for the application. For example, the administrator can provide additional inputs for commands for the configuration of the application. The client 187 transmits the commands in operation 219 to configuration application server 150, and the commands are received by configuration application server 150 in operation 220. Such commands can be inputted directly on the web-based interface. Configuration application server then configures the application accordingly in operation 223. Commands can be communicated by the administrator until the application is fully configured and, as such, operations 219-223 can be repeated until the application is appropriately configured. In some embodiments, the commands include commands to change the configuration and/or configure an operating system. While FIG. 2 illustrates client 187 transmitting the commands directly to configuration application server 150, the commands may also be transmitted to configuration application server 150 using web server 180 in some embodiments.

At the same time the administrator can provide additional inputs for commands to construct and/or configure the metadata. For example, in some embodiments, the administrator can edit metadata about the application, such as the application icon, the gesture and keyboard mapping, and screen grab information. The administrator can even test the application in some embodiments. The commands for the metadata can be transmitted by client 187 separately to web server 180 in operation 224. The commands are received by web server 180 in operation 225. Web server 180 configures the metadata in operation 226. Operations 224 to 226 can be repeated until the metadata is fully configured. The metadata is transmitted by web server 180 to data management system 192 in operation 227. The metadata is received by data management system 192 in operation 228. Data management system 192 stores the metadata in database 194 (shown in FIG. 1) in operation 229.

After the application is installed and configured, then in operation 230, configuration application server 150 generates an image based on the application configuration. The image is transmitted by configuration application server 150 to data management system in operation 231. Data management system 190 receives the image in operation 232. In operation 233, data management system 190 stores the image in database 191 (shown in FIG. 1). While FIG. 2 illustrates the configuration application server 150 transmitting the image data to data management system 190, the image may also be generated and transmitted by web server 180 or a different server.

Figure 3C:
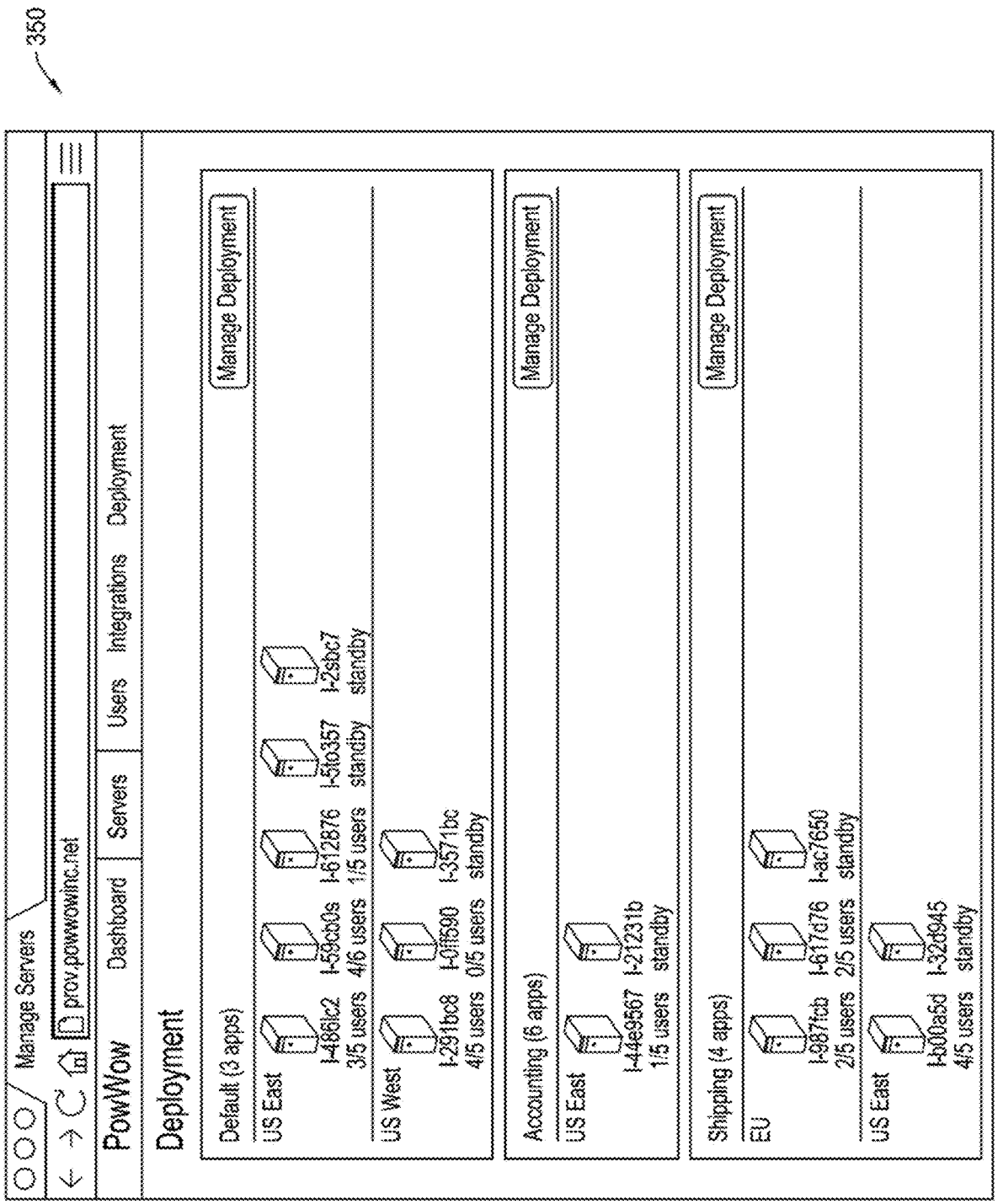

The image and other related data can then be deployed to one or more servers, such as application servers 170 and 172 (shown in FIG. 1) in order to scale the application and the application can be run by the application servers 170 and 172 for remote terminals 120 and 122. In some embodiments, the deployment of the application can be controlled by the administrator. For example, FIG. 3C illustrates an output 350 that can be generated by web server 180, wherein output 350 displays information about application servers, such as application servers 170 and 172

Output 350 enables the administrator to control the scaling and deployment of the application based on the number of servers they would like available and the locations from which they would like those servers to be available. For example, referring to FIG. 2, web server 180 generates the output of the servers, such as output 350, in operation 234. In some embodiments, web server 180 generates the output based on information received directly from the pertinent application servers, such as application servers 170 and 172. In operation 235, web server 180 transmits the output to client 187. The output is received by client 187 in operation 236 and the administrator can see the output via display 188. Using the output with the web-based interface, the administrator can input commands. The commands can include how and where to deploy the images and/or any image data stored in database 191 and 192, respectively. The commands are transmitted to web server 180 in operation 237. In some embodiments, the commands can be transmitted to application servers 170 and 172 directly. Web server 180 receives the commands in operation 238 and web server 180 transmits requests to receive the image and any related image data to data management system 190 and to data management system 192 in operation 240. Data management system 190 and 192 receive the requests in operation 242 and 243, respectively. Data management system 190 transmits the image in operation 244 and Data management system 192 transmits the related metadata in operation 245. In some embodiments, the image and any related image data can be transmitted to a new server not pictured in order to create a new instance of the application. In other embodiments, the image and any related image data can be transmitted directly to existing application servers 170 and/or 172 in order to create a new instance of the application or to update the application.

After the image and/or image data is received by application servers 170 and/or 172, the image and/or image data can be transmitted or deployed by application server 170 and/or 172 to remote terminals 120 and 122 such that the application can be shared with end users. In some embodiments, system 100 is enabled to share the image and/or related data by using the systems and methods described in co-pending U.S. patent application Ser. No. 14/097,167 entitled SYSTEMS AND METHODS FOR SHARING IMAGE DATA filed on Dec. 4, 2013, which is incorporated herein by reference in its entirety.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more non-transitory computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), blue-ray disc (BD-ROM), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, as mentioned above, one or more embodiments of the present disclosure may also be provided with a virtualization infrastructure. While virtualization methods may assume that virtual machines present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are non-limiting, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising:
    at least one processor and at least one memory coupled to said at least one processor; and
    a web server and a configuration application server, wherein each of the web server and the configuration application server is coupled to said at least one processor and to said at least one memory device, wherein said web server is configured to:
    receive at least one first signal from at least one client representing a request for an initiation of said configuration application server for the installation and configuration of an application;
    connect with said configuration application server after receiving the at least one first signal to facilitate installing the application;
    receive at least one second signal from the at least one client representing at least one command to configure metadata about the application;
    configure the metadata based on the at least one command; and
    transmit the configured metadata to a data management system; and
    wherein said configuration application server is configured to:
    receive, from the at least one client, an application installer to install the application in a plurality of portions;
    commence installing the application based on each of the plurality of portions being received;
    transmit a status notification to the at least one client for each of the plurality of portions;
    configure the application based on at least one input received from the at least one client;
    generate an image based on the configured application; and
    transmit the image to the data management system, wherein the server image and the metadata are stored in the data management system for deployment.

2. The system of claim 1, wherein said configuration application server is configured to
    generate an image based on the configured metadata.

3. The system of claim 2, further comprising at least one application server in communication with said web server and with said configuration application server, wherein said at least one application server is configured to:
    receive the image and the corresponding configured metadata that is stored in the data management system; and
    deploy the image and the corresponding configured metadata to at least one remote terminal.

4. The system of claim 3, wherein said at least one application server is configured to run the application with the configured metadata for the at least one remote terminal.

5. The system of claim 3, wherein said web server is further configured to generate at least one output that displays information about said at least one application server.

6. The system of claim 5, wherein said web server is further configured to transmit the at least one output to the at least one remote terminal.

7. The system of claim 1, wherein said web server is configured to configure the metadata by being configured to at least one of construct or edit the metadata.

8. The system of claim 1, wherein said web server is configured to configure the metadata by being configured to edit at least one of an application icon, a gesture mapping, a keyboard mapping, and screen grab data.

9. A method of configuring metadata, said method comprising:
    receiving at least one first signal from at least one client, via a web server, wherein the at least one first signal represents a request for an initiation of a configuration application server for the installation and configuration of an application;
    connecting the web server with the configuration application server after receiving the at least one first signal to facilitate installing the application;
    receiving at least one second signal from the at least one client, via the web server, wherein the at least one second signal represents at least one command to configure metadata about the application;
    configuring, via the web server, the metadata based on the at least one command;
    transmitting the configured metadata from the web server to a data management system;
    receiving by the configuration application server from the at least one client an application installer to install the application in a plurality of portions;
    installing, by the configuration application server, the application based on each of the plurality of portions being received;
    transmitting by the configuration application server to the at least one client a status notification to the at least one client for each of the plurality of portions;
    configuring, by the configuration application server, the application based on at least one input received from the at least one client;
    generating, by the configuration application server, an image based on the configured application; and
    transmitting, by the configuration application server, the image to the data management system, wherein the server image and the metadata are stored in the data management system for deployment.

10. The method of claim 9, further comprising
    generating the image based on the configured metadata, via the configuration application server.

11. The method of claim 10, further comprising:
connecting at least one application server with the web server and the configuration application server;
receiving the image and the corresponding configured metadata that is stored in the data management system, via the at least one application server; and
deploying the image and the corresponding configured metadata from the at least one application server to at least one remote terminal.

12. The method of claim 11, further comprising running the application with the configured metadata for the at least one remote terminal.

13. The method of claim 11, further comprising generating, via the web server, at least one output that displays information about the at least one application server.

14. The method of claim 13, further comprising transmitting the at least one output from the web server to the at least one remote terminal.

15. The method of claim 9, wherein configuring the metadata comprises at least one of constructing or editing the metadata.

16. The method of claim 9, wherein configuring the metadata comprises editing at least one of an application icon, a gesture mapping, a keyboard mapping, and screen grab data.

17. At least one non-transitory computer-readable storage medium having computer-executable instructions embodied thereon, wherein, when executed by at least one processor, the computer-executable instructions cause the at least one processor to:
receive at least one first signal that is representative of a request for the installation and configuration of an application;
facilitate installing the application;
receive at least one second signal that is representative of at least one command to configure metadata about the application;
configure the metadata based on the at least one command;
receive an application installer to install the application in a plurality of portions;
install the application based on each of the plurality of portions being received;
transmit a status notification for each of the plurality of portions;
configure the application based on at least one input;
generate an image based on the configured application; and
transmit the configured metadata and the image to a data management system, wherein the server image and the metadata are stored in the data management system for deployment.

18. The at least one non-transitory computer-readable storage medium of claim 17, wherein the computer-executable instructions further cause the at least one processor to generate the image based on the configured metadata.

19. The at least one non-transitory computer-readable storage medium of claim 18, wherein the computer-executable instructions further cause the at least one processor to deploy the image and the corresponding configured metadata to at least one remote terminal.

20. The at least one non-transitory computer-readable storage medium of claim 19, wherein the computer-executable instructions further cause the at least one processor to run the application with the configured metadata for the at least one remote terminal.

21. The at least one non-transitory computer-readable storage medium of claim 17, wherein the computer-executable instructions cause the at least one processor to configure the metadata by causing the at least one processor to construct the metadata.

22. The at least one non-transitory computer-readable storage medium of claim 17, wherein the computer-executable instructions cause the at least one processor to configure the metadata by causing the at least one processor to edit the metadata.

23. The at least one non-transitory computer-readable storage medium of claim 17, wherein the computer-executable instructions cause the at least one processor to configure the metadata by causing the at least one processor to edit at least one of an application icon, a gesture mapping, a keyboard mapping, and screen grab data.

24. A system comprising:
at least one processor and at least one memory coupled to said at least one processor,
at least one server coupled to said at least one processor and said at least one memory device, said at least one server comprises a web server and a configuration application server, wherein said web server is configured to:
receive at least one signal from at least one client representing at least one command to configure metadata about the application;
configure the metadata based on the at least one command; and
transmit the configured metadata to a data management system, wherein the data management system is configured to store the configured metadata in a database; and
wherein said configuration application server is configured to:
transmit at least one display image to the at least one client such that the at least one client is enabled to render the at least one display image via a web interface, wherein the at least one display image provides information regarding said configuration application server;
receive an application installer, wherein the at least one client is enabled to use the web interface to facilitate a transmission of the application installer in a plurality of portions;
commence installing the application based on each of the plurality of portions being received;
transmit a plurality of status notifications to the at least one client until each of the plurality of portions have been received by the at least one client, wherein each of the plurality of status notifications corresponds to a receipt of a different portion of the plurality of portions;
configure the application based on at least one input received from the at least one client, wherein the at least one client is enabled to use the web interface to facilitate transmitting the at least one input to said configuration application server;
generate a server image based on the application configuration; and
transmit the server image to the data management system, wherein the server image is stored in the data management system for deployment.

* * * * *